July 14, 1964 GERHARD-GÜNTER GASSMANN 3,141,142

RELAXATION OSCILLATOR EMPLOYING SELECTIVE AND NON-SELECTIVE FEEDBACK

Filed Nov. 18, 1960

INVENTOR
G.G.GASSMANN

BY

ATTORNEY

United States Patent Office 3,141,142
Patented July 14, 1964

3,141,142

RELAXATION OSCILLATOR EMPLOYING SELECTIVE AND NON-SELECTIVE FEEDBACK

Gerhard-Günter Gassmann, Berkheim, Germany, assignor, by mesne assignments, to International Standard Electric Corporation, New York, N.Y., a corporation of Delaware Filed Nov. 18, 1960, Ser. No. 70,271
Claims priority, application Germany Dec. 15, 1959
3 Claims. (Cl. 331—144)

Figure 1:
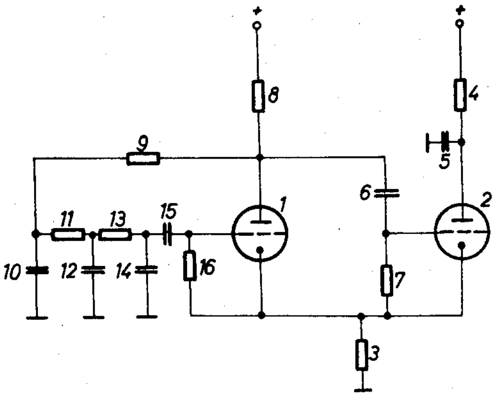

The present invention relates to a relaxation oscillator operating on the multivibrator or transitron principle and comprising a non-selective feedback path consisting of resistors and capacitors, for producing relaxation oscillations which, with the aid of a resistor-capacitor network, are capable of being converted into a sawtooth oscillation.

Such types of relaxation oscillators only have a relatively low frequency stability. For example, the frequency is subject to considerable variations on account of changes in voltage or of tube-aging phenomena. In order to overcome this deficiency it is known to employ a so-called flywheel circuit. The employment of such a circuit indeed provides a sufficient frequency stability in many cases. Unfortunately, however, this solution is only applicable to such frequency ranges in which oscillating circuits with a suitable Q-factor and a reasonable economical expenditure can still be realized. The lower frequency limit may lie at some kilocycles. With respect to the low-frequency range from 0 . . . 1 kc./s. this method no longer appears to be sensible. A further disadvantage of this principle resides in the fact that the stabilization bandwidth is relatively small due to the small bandwidth of the stabilizing circuit. The term stabilizing bandwidth refers to the frequency range of the relaxation oscillator in which the oscillating circuit has a stabilizing effect. When using a circuit with a lower Q-factor the stabilizing bandwidth may be increased; at the same time, however, the stabilizing effect is decreased. Accordingly, a compromise has to be made between the stabilization and the stabilizing bandwidth. An additional retuning of the circuit to the respective relaxation frequency, of course, is theoretically possible, but can hardly be expected to be employed in practice due to the expenditure entailed thereby, above all in the case of relaxation generators whose frequency is supposed to be varied with the aid of a control voltage.

With respect to a relaxation oscillator operating on the multivibrator or transitron principle comprising a non-selective feedback path consisting of a resistor and capacitor for producing relaxation oscillations which, with the air of a resistor-capacitor network, are capable of being converted into a sawtooth oscillation; and with respect to obtaining a high frequency stability, it is proposed by the invention that the same electrode of the tube from which the non-selective feedback path (for producing the relaxation oscillations) is branched off, also feeds an additional second frequency- or phase-selective feedback path which is almost impermeable to pulse-shaped voltages (for enabling the independent production of sinusoidal oscillations). The said additional second feedback path terminating at a different control electrode than the non-selective feedback path, so that both oscillations are superimposed upon one another at the common feedback output electrode, thus causing a strong coupling between the two oscillations. Thereby the relaxation oscillation assumes the same frequency as the sinusoidal oscillation, or one harmonic thereof. By the coupling of an oscillation produced with a selective feedback path, to an oscillation produced with a non-selective feedback path, the first mentioned oscillation becomes substantially frequency-determining. Accordingly, the relaxation oscillation is the passive oscillation. Since its feedback path is of the non-selective type, the stabilization bandwidth is very large. However, the frequency stability is likewise very high, because the frequency-determining oscillation is the sinusoidal oscillation whose frequency is extensively independent of tube-aging phenomena and supply-voltage variations.

The inventive arrangement has the advantage over the conventional types of circuit arrangements employing sine-wave oscillators, in which the sinusoidal voltage is subsequently distorted into a relaxation or sawtooth voltage in an overdriven amplifier tube, that it enables the production of very steep relaxation edges.

FIG. 1 shows one particular type of circuit arrangement according to the invention. In this drawing the reference numerals 1 and 2 indicate the two tube systems, and the reference numeral 3 indicates the common cathode resistance belonging to the feedback path of the relaxation oscillation. The RC-circuit 4, 5 in the anode of tube 2 serves to convert the pulsating anode current of this tube into a sawtooth voltage. 6 indicates the coupling capacitor adapted to close the feedback path for the relaxation oscillation. Reference numeral 7 indicates the pertaining leakage resistance. 8 indicates the anode resistance of the tube system 1. Reference numeral 9 indicates the first resistor of the network producing the sinusoidal oscillations, which network commences with T-section 9, 10, 11 and terminates with the $\pi$-section 12, 13, 14. This resistor is simultaneously adapted to serve as a de-coupling resistor for the relaxation oscillation. In other words: the value of the input resistance of the network producing the sinusoidal oscillations is high, so as not to shunt the relaxation oscillation. The output capacitor 14 is simultaneously adapted to block the grid against the relaxation oscillations, because the tube system 1 operates as a grid-base amplifier for the relaxation oscillation. In other words: the value of the output resistance of the network producing the sinusoidal oscillations is low, in order to represent a short-circuit with respect to the relaxation oscillation. Both the coupling capacitor 15 and the leakage resistance 16, by way of a grid rectification, serve to provide an additional grid bias by which the amplitude of the sinusoidal voltage is stabilized. Accordingly, only a sinusoidal voltage is applied to the grid of tube 1, and a sawtooth voltage is exclusively applied to the anode of tube 2, while a sinusoidal voltage superimposed to the relaxation pulse is applied to the anode of tube 1; the duration of the said relaxation pulse being identical with the duration of the return movement of the sawtooth voltage.

Figure 2:
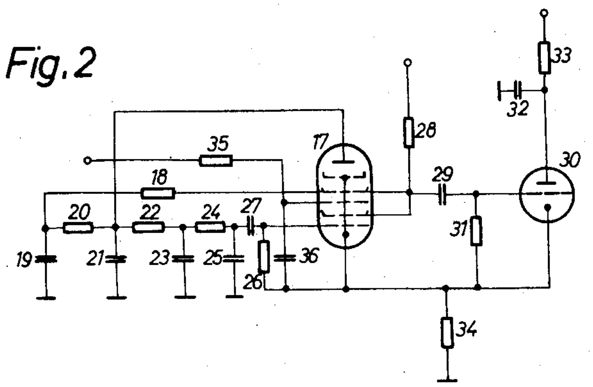

FIG. 2 shows a modified type of circuit arrangement. The hexode or heptode system 17, with its cathode, the first control grid and the screen grid, operates as a triode in the same way as the tube system 1 in FIG. 1: the filter circuit 18, 19, 20, 21, 22, 23, 24 and 25 forms the selective feedback path. The capacitor 27 serves as a coupling capacitor, and the resistor 26 as a leakage resistance. The resistor 28 is the screen-grid operating resistance. Accordingly, the selective as well as the non-selective feedback path are branched from the screen grid. Reference numeral 29 indicates the coupling capacitor for effecting the coupling with the control grid of the triode system 30. 31 indicates the pertaining leakage resistance. The anode RC-circuit 32, 33 serves to convert the pulse current into a sawtooth voltage. Reference numeral 34 indicates the common cathode resistance. For the purpose of retuning the frequency a control voltage is applied to the second control grid of tube system 17 via the filter resistor 35. The control voltage serves to control the intensity of the anode-alternating current. The capacitor 36 acts as the filter capacitor for the control voltage. There the anode current is fed into the feedback network stimulating the sinusoidal oscillations (in FIG. 2 between the resistor 20 and the resistor 22). At this point a sinusoidal voltage exists whose phase is shifted approximately by 90° with respect to the anode-alternating voltage, so that the anode current will act as a detuning reactive current.

Figure 3:
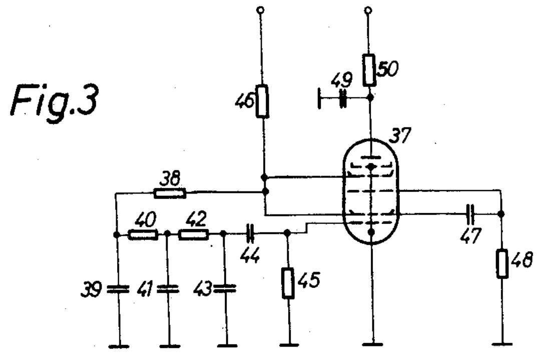

The examples of FIG. 1 and FIG. 2 showed multivibrators. However, the inventive type of circuit arrangement can also act as a transitron. FIG. 3 shows a corresponding example of such a circuit arrangement. To the screen grid of the pentode, hexode or heptode system 37—just like to the anode of the tube system 1 in the case of the multivibrator in FIG. 1—there is applied the relaxation oscillation as well as the sinusoidal oscillation. The filter circuit 38, 39, 40, 41, 42, 43 forms the selective feedback path. This feedback path is terminated via the coupling capacitor 44 at the first control grid of the tube system. Reference numeral 45 indicates the leakage resistance. 46 is the screen-grid-operating resistance. The non-selective feedback path is established by the coupling capacitor 47 connecting the screen grid with the second control grid or, in the case of pentodes, with the suppressor grid. The resistor 48 serves as a leakage resistance. The anode RC-circuit 49, 50 finally, serves to convert the pulsating current into a sawtooth voltage. To the first control grid there is only applied the sinusoidal voltage, while the relaxation oscillation is applied to the second control grid.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A frequency stable relaxation oscillator operating on the multivibrator principle and employing two triode systems comprising in combination a high input—low output—impedance frequency selective feedback path connected between the anode and grid of the first triode, said path including a multisection low-pass filter commencing with a T-section and terminating in a $\pi$-section, a non-selective feedback path comprising a coupling capacitor connected between said anode and the grid of the second triode, means for connecting the cathodes of said triode systems in common, and a resistor-capacitor network connected to the anode of the second triode for converting the derived relaxation oscillations into sawtooth waves.

2. A frequency stable relaxation oscillator operating on the transitron principle comprising in combination an electron discharge tube of at least five electrodes, a high input-low output-impedance frequency selective feedback path connected between the second and first grid of said tube, said path including a multisection low-pass filter commencing with a T-section and terminating in a $\pi$ section, a non-selective feedback path comprising a coupling capacitor connected between said second grid and the third grid of said tube, and a resistor-capacitor network connected to the anode of said tube for converting the derived relaxation oscillations into sawtooth waves.

3. A frequency stable relaxation oscillator operating on the multivibrator principle and employing a first hexode stage and a second triode stage comprising in combination a high input—low output—impedance frequency selective feedback path connected between the screen grid and first control grid of said hexode, said path including a multisection low-pass filter commencing with a T-section and terminating in a $\pi$-section, control voltage means connected to the second control grid of said hexode for effecting a retuning of the frequency, means for connecting the anode of said hexode into the selective feedback path, a non-selective feedback path comprising a coupling capacitor connected between said screen grid and the control grid of said second triode, means for connecting the cathode of said first and second stages in common, and a resistor-capacitor network connected to the anode of said second triode for converting the derived relaxation oscillations into sawtooth waves.

References Cited in the file of this patent

UNITED STATES PATENTS

| | | |
|---|---|---|
| 1,442,781 | Nichols | Jan. 16, 1923 |
| 2,419,772 | Gottier | Apr. 29, 1947 |
| 2,552,303 | Anderson | May 8, 1951 |
| 2,755,385 | Parsons | July 17, 1956 |

FOREIGN PATENTS

| | | |
|---|---|---|
| 581,419 | Great Britain | Oct. 11, 1946 |